United States Patent [19]

Jones et al.

[11] Patent Number: 5,088,529

[45] Date of Patent: Feb. 18, 1992

[54] VEHICLE BRAKE VACUUM EVACUATION AND BRAKE FLUID FILL MACHINE

[75] Inventors: Daniel G. Jones, Romeo; James A. Cole, Sterling Heights, both of Mich.

[73] Assignee: General Motors Corporation, Detroit, Mich.

[21] Appl. No.: 572,634

[22] Filed: Aug. 27, 1990

[51] Int. Cl.$^5$ .............................................. B65B 31/00
[52] U.S. Cl. ........................................ 141/59; 141/61; 141/98
[58] Field of Search ........................ 141/61, 59, 60, 65, 141/98, 287, 301, 302, 381, 383; 188/352; 60/533

[56] References Cited

U.S. PATENT DOCUMENTS

| | | | |
|---|---|---|---|
| 4,493,349 | 1/1985 | Pomponio, Sr. | 141/59 |
| 4,624,290 | 11/1986 | Compton et al. | 141/98 |
| 4,693,286 | 9/1987 | Lock et al. | 141/61 |

Primary Examiner—Ernest G. Cusick
Assistant Examiner—David J. Walczak
Attorney, Agent, or Firm—Ernest E. Helms

[57] ABSTRACT

A vehicle braking system evacuation and fluid fill machine which utilizes a lightweight, compact filler head which is easily mounted on top of the vehicle master cylinder and a venturi type vacuum pump which effectively vacuums the air out of the vehicle brake system in order to allow brake fluid to enter and completely fill the brake system.

6 Claims, 1 Drawing Sheet

VEHICLE BRAKE VACUUM EVACUATION AND BRAKE FLUID FILL MACHINE

FIELD OF THE INVENTION

The field of the present invention is that of vacuum evacuation and fill machines for vehicle braking systems.

DISCLOSURE STATEMENT

There are two major methods of filling the brake system in a vehicle when assembling the vehicle at an assembly plant. A prior method was to open up the bleeding ports in the brake system and fill the brake system allowing the excess fluid to spill out. The above invention technique was not preferable due to the excess brake fluid spilling over the work place and the cost of the wasted brake fluid.

To overcome the disadvantages of the above noted method, there have been developed vacuum evauation and fill systems. In the vacuum evacuation and fill system, a clamp is put over a filler tube of the master cylinder reservoir and the whole vehicle braking system is placed into a vacuum. When a vacuum level of approximately 5-7 torr is reached, the vacuum is turned off and then brake fluid is inserted into the system. Therefore the bleeding ports need not be open to insure the appropriate fill of brake fluid into the braking system and to insure that there is no air left into the braking system.

Prior to the present invention most vacuum evacuation and fill machines used an electromechanical vacuum pump (contained in a controller cabinet) which weighed approximately 700 lbs. Therefore, this system could not be positioned over the vehicle. Since the vacuum pump was so heavy and could not be placed overhead of the vehicle there had to be a long line from the vacuum pump to the filler head (commonly referred to as the filler head adaptor) which was placed upon the master cylinder filler tube. Additionally, care had to be taken to prevent contamination of the pump lubricating oil with brake fluid entering the vacuum system. Also, when a vehicle with a different configuration of master cylinder was to be assembled, a different filler head had to be changed to the machine.

SUMMARY OF THE INVENTION

To provide a vacuum evacuation and brake fluid fill machine which is an alternative to that previously provided the present invention is brought forth. The present invention provides a much more compact air powered venturi vacuum pump evacuation and fill machine.

The air powered pump allows the filler head of the evacuation and fill machine to be so light that it can be easily mounted on top of the vehicle master cylinder by a swing arm and easily manipulated by the assembler. More significantly, the air driven evacuation and fill machine provides a significant capital cost savings.

The fact that the vacuum pump is located directly on the fill head greatly reduces evacuation times because of the reduction of the line lengths and the plumbing involved.

The air powered vacuum pump allows a significant energy usage reduction because unlike the electromechanical pump it is only running during the actual cycle whereas the electromechanical pump has to run at all times to maintain the vacuum.

The air powered venturi pumps have a very low maintenance because there is no requirement for lubricating oil. Since there is no oil, there is no problem of contamination of the oil due to involvement with the braking fluid.

Is an object of the present invention to provide a vehicle brake system vacuum evacuation and fill machine which is less bulky than those previously provided.

Other objects, desires and advantages of the present invention can become more apparent to those skilled in the art as the nature of the invention is better understood from the accompanying drawings and a detailed description.

DETAILED DESCRIPTION OF THE DRAWINGS

Figure 1:
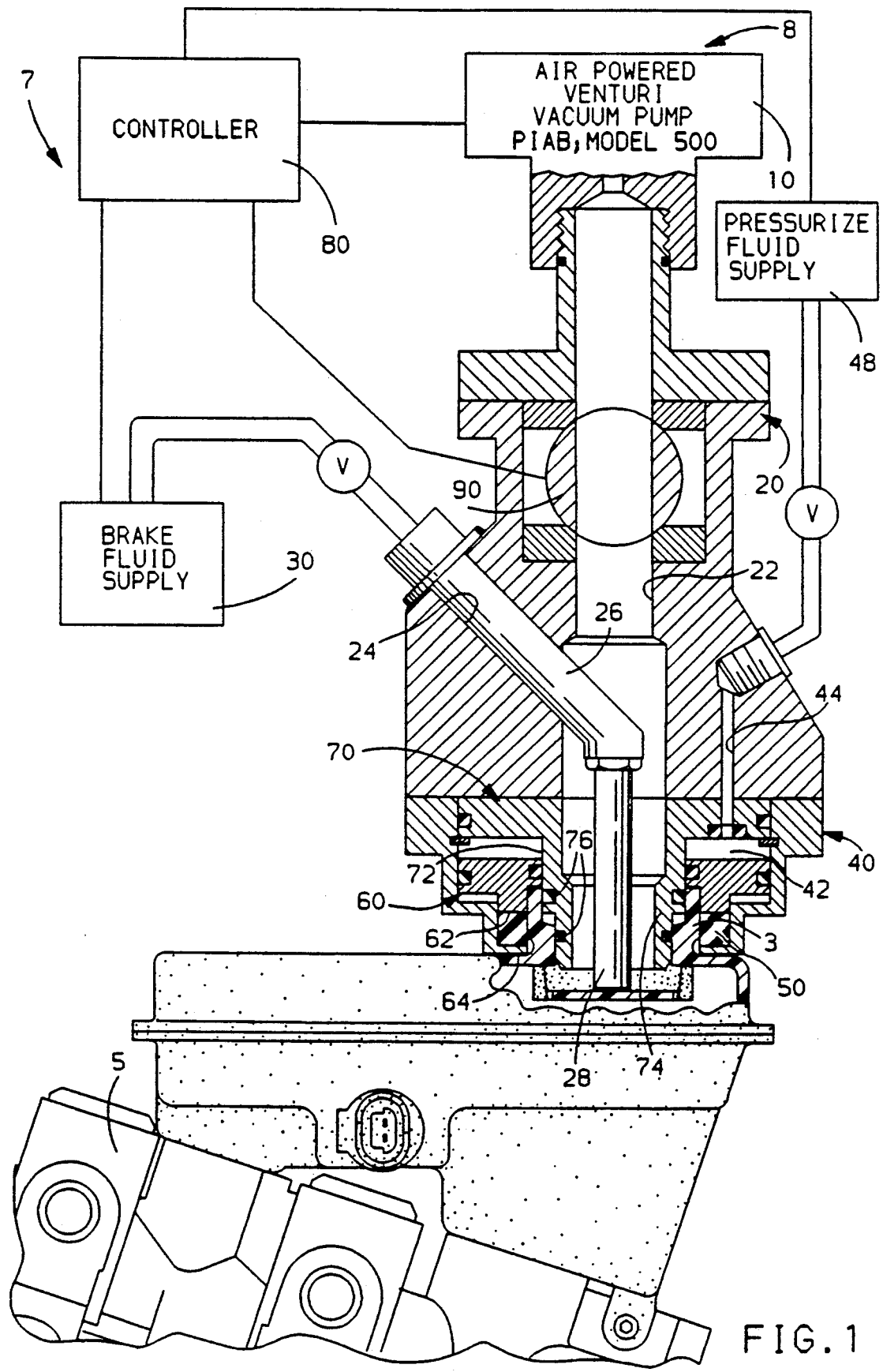
FIG. 1 is a cross-sectional view of a filler head of a preferred embodiment vehicle braking system evacuation and brake fluid fill machine of the present invention along with other portions of the machine shown schematically.

Referring to FIG. 1 a vehicle braking system evacuation and brake fluid fill machine (7) of the present invention has a filler head (8) which utilizes a venturi type vacuum pump (10) and in the embodiment illustrated a PIAB Model 500 is utilized. The PIAB vacuum pump provides approx 5-7 Torr of vacuum at 500 CFM.

Fixably connected with the vacuum pump (10) is the frame (20) of the filler head. The frame of the filler head has a central longitudinal bore or first passage (22) to allow fluid communication between the vacuum pump and the brake system of the vehicle. The frame also has a second passage (24) intersecting with the first passage allowing for the selective filling of brake fluid. The second passage (24) has a slant tube (26) which extends into the first passage (22) and then an elongated tube (28) which allows from a brake fluid supply means (30) to deliver brake fluid at a point which extends below the lowest level (in a direction towards a vehicle master cylinder (5) of the first passage (24).

The frame (20) also has a clamp member (40) which provides an interior chamber (42) for the frame. Connected with the interior chamber of the frame is a third passage (44) which allows for the selective delivery of pressurized fluid (usually from a plant pressurized air system) to the interior chamber (42) by a pressurized fluid supply means (48).

Sealably and slidably mounted within the interior chamber (42) is an annular piston (60). The piston (60) has a contact area (62) which function will be later described. The piston (60) is translationally responsive to presurrized fluid being delivered through the third passage (44).

Detachably connected with the frame (20) is a seal adapter (70). The seal adapter (70) has a sealing surface (72) for sealing with the interior surface of the piston (60) which is annular shaped and also has an extension (74) of the first passage (22) which communicates with the first passage of the frame (20). The extension (74) has seal members (76) to seal the inner periphery of a filler tube of a master cylinder reservoir.

The detachability of the seal adapter allows the filler head (8) to be used with a multitude of master cylinders by simple changing of the seal adapter. The seal adapter (70) as shown here is annular shaped however if need be it can be of any configuration which would allow it to mate with the port of the reservoir of the master cylinder in a sealing relationship.

The elongated tube (28) extends below the seal adapter (70) to prevent droplets and brake fluid accumulating within the first passage of the seal adapter.

Captured between the piston (60) and a flange (64) of the clamp (40) is the elastomeric sealing member (50) which when contacted by the piston contact area (62) is extruded inwardly into a sealing relationship with the filler tube of the master cylinder reservoir.

As mentioned previously the second passage (24) is connected with the brake fluid (30) which can fill or evacuate (scavenge) the fluid via the second passage (24). The brake fluid supply is controlled by a controller (80). The pressurized fluid supply (48) is also directed by the controller (80).

Between the vacuum pump (10) and the outlet of the first passage of the seal adapter is a valve (90) which is utilized to isolate the vacuum pump (10) from the vehicle braking system and fluid supply (30) when appropriate.

The operation of the machine (7) is as follows. The filler head (8) is clamped to the (port) filler tube (3) of the master cylinder (5) of the brake system by the admittance of pressurized fluid through the third passage translating the piston (60) until the piston contact surface (62) hits the elastomeric sealing member (50) and causes it to surround the filler tube in a sealing and clamping relationship. The controller then signals the valve (90) to open and the venturi pump (10) is started to withdraw air from the braking system. An air pressure gauge (not shown) will indicate to the controller if the vacuum level within the braking system is appropriate and if the vacuum level has increased in relation to time to determine if the evacuate and fill machine (7) is properly sealed or if the braking system has any leaks. If a leak is determined the operation will cease.

If there is no leakage, valve (90) will close and the vacuum pump (10) is shut off by the controller (80). At the end of the above noted evacuation the brake fluid is pressurized through the second passage (24) system for a specified time usually overfilling the brake system. The brake fluid supply will then indicate (by virture of a controller signal) a scavenging cycle. The controller then signals the pressurized fluid supply (48) to vent the third passage (44) and interior chamber (42) and the elasticity of the sealing will cause the piston to be pushed upward and the seal relationship between the filler head (8) and the filler tube (3) will be terminated. The filler head (8) can then be removed to the side to allow the vehicle to proceed down the assembly line.

While an embodiment of the present invention have been explained it will be really apparent to those skilled in the art of the various modifications which can be made to the present invention without departing from the spirit and scope of this application as it is encompassed by the following claims.

We claim:

1. A vacuum evacuation and brake fluid fill machine for applying a vacuum to a vehicle braking system having a master cylinder, a master cylinder reservoir and a filler tube, the system in combination comprising:

a frame having a first passage for communication of air therethrough and the frame having a second passage intersecting with the first passage for communication of brake fluid therethrough, and the frame having an internal chamber with a connected third passage for communication of pressurized fluid therethrough;

a seal adapter connected with the frame providing means to seal an inner diameter of the filler tube and having a passage in fluid communication with the frame first passage;

a piston sealably slidably mounted within the interior chamber translationally responsive to the pressurized fluid communicated through the third passage, the piston also having a contact surface;

an elastomeric seal for surrounding the filler tube and sealing a periphery thereof when the seal is contacted by the contact surface of the piston;

pressurized fluid supply means for selectively communicating with the third passage;

brake fluid supply means for selectively supplying and withdrawing brake fluid through the second passage;

a compact air power vacuum pump connected with the frame for supplying a vacuum to the braking system via the first passage;

valve means to isolate the vacuum pump at least from a portion of the first passage; and a controller for directing the operation of the pressurized fluid supply means, brake fluid supply means, air pump, and valve means, to sequentially move said piston to seal the filler tube of the master cylinder, open the valve means to connect air pump with the braking system, evacuate the braking system, close the valve to isolate the air pump from the braking system, fill and/or afterwards remove braking fluid from the braking system, and release the sealing means from a sealed relationship with the filler tube.

2. An apparatus as described in claim 1 further described wherein the seal adapter is detachable from the frame and can be changed to mate with master cylinder tubes of different dimensions.

3. An apparatus as described in claim 1 further including a tube in the second passage of the frame, the tube extending down through the first passage and extending towards the master cylinder.

4. An apparatus as described in claim 3 wherein the tube of the second passage extends beyond the frame and the seal adapter first passages.

5. An apparatus as described in claim 3 wherein the air powered vacuum pump is a venturi vacuum pump.

6. A vacuum evacuation and brake fluid fill machine for applying a vacuum to a vehicle braking system having a master cylinder, a master cylinder reservoir and a filler tube the system in combination comprising:

a frame having a first passage for communication of air therethrough and the frame having a second passage intersecting with the first passage for communication of brake fluid therethrough, and the frame having an internal chamber with a connected third passage for communication of pressurized fluid therethrough;

a detachable seal adapter connected with the frame providing means to seal an inner diameter of the filler tube and having a passage in fluid communication with the frame first passage;

a tube connecting with the second passage and extending in a direction towards the master cylinder within the first passage and the tube extending within and beyond the seal adapter first passage;

an annular piston sealably slidably mounted within the interior chamber translationally responsive to the pressurized fluid communicated through the third passage, the piston also having a contact surface;

an elastomeric seal surrounding the filler tube and sealing a peripherally thereof when the seal is contacted by the contact surface of the piston;

pressurized fluid supply means for selectively communicating with the third passage;

brake fluid supply means for selectively supplying and withdrawing brake fluid through the second passage;

a compact venturi air power vacuum pump connected with the frame for supplying a vacuum to the braking system via the first passage;

valve means to isolate the vacuum pump at least from a portion of the first passage; and a controller for directing the operation of the pressurized fluid supply means, brake fluid supply means, air pump, and valve means, to sequentially move said piston to seal the filler tube of the master cylinder, open the valve means to connect the air pump with the braking system, evacuate the braking system, within the air pump close the valve to isolate the air pump from the braking system fill and/or afterwards remove braking fluid from the braking system with the brake fluid supply means and release the sealing means from a seal relationship with the filler tube.

* * * * *